A. J. KLEIN.
Method of Constructing Metal Safes and Vaults.
No. 231,231. Patented Aug. 17, 1880.
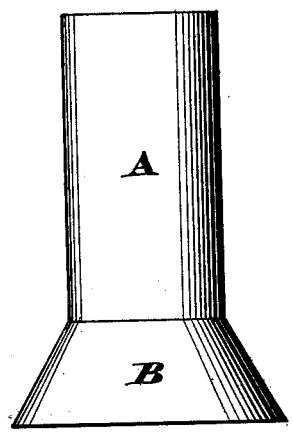
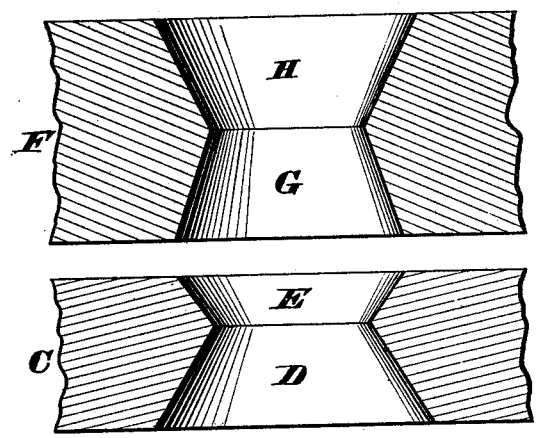
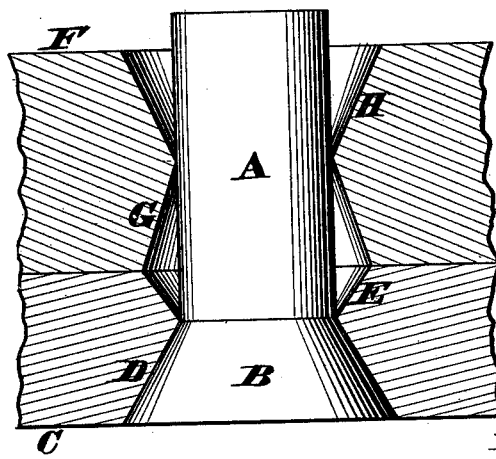
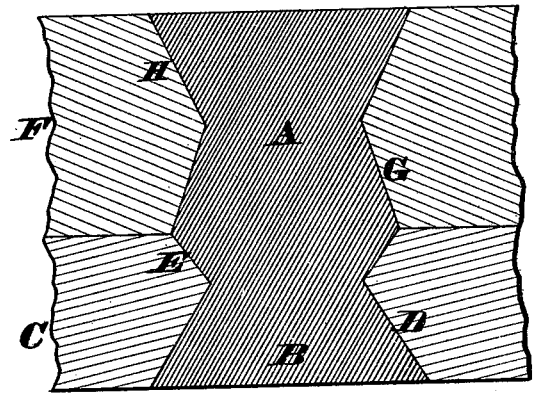
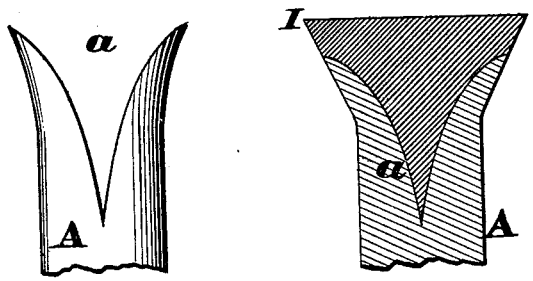

UNITED STATES PATENT OFFICE.

ALOIS J. KLEIN, OF CINCINNATI, OHIO.

METHOD OF CONSTRUCTING METAL SAFES AND VAULTS.

SPECIFICATION forming part of Letters Patent No. 231,231, dated August 17, 1880.

Application filed December 6, 1879.

*To all whom it may concern:*

Be it known that I, ALOIS J. KLEIN, of Cincinnati, Hamilton county, Ohio, have invented certain new and useful Improvements in the Construction of Burglar-Proof Safes, Vaults, and other similar structures, of which the following is a specification.

This invention comprises a novel process of constructing safes, vaults, and other structures composed of a series of plates or bars securely bolted or riveted together; and the first part of my improvements consists in hardening such bolts or rivets after they have been upset or headed or otherwise secured to the plates.
Each bolt or rivet is first heated, and then inserted in the proper hole of the plates to be joined together, after which act the bolt or rivet is headed or upset by hammering or otherwise, and a stream of cold water is immediately projected against the heated bolt, so as to thoroughly harden the latter, as hereinafter more fully described.

The second part of my improvements consists in carrying this process a step farther for the purpose of securely anchoring the rivets in the safe or vault or other structure, which result is accomplished by countersinking the opposite ends of the rivet-holes in each plate, so as to cause said holes to have an approximately hour-glass shape, into which reversely-flaring openings the heated rivet is firmly anchored, when the said rivet is expanded in the act of being upset or headed, as hereinafter more fully described.
In the annexed drawings, Figure 1 is a side elevation of one of the bolts or rivets employed for uniting the plates. Fig. 2 is a section of the outer and inner plates of a safe, properly counterbored on both sides, but separated from each other. Fig. 3 is another section, in which said plates are shown brought together and the heated rivet inserted in the holes of the same. Fig. 4 is a section showing the rivet or bolt swaged up and expanded laterally so as to fill the countersunk holes of the plates. Figs. 5 and 6 represent successive stages in the csnstruction of the preferred form of rivet used for uniting the plates.

The rivet or bolt, which may be made of iron or steel or other hard metal or composition of metals, consists preferably of a cylindrical shank, A, and a conical head, B, the length of said rivet being somewhat greater than the united thickness of the plates to be secured together, in order to afford sufficient metal for the subsequent upsetting operations.

C represents the outer plate of a vault or safe or other metallic structure, which plate may be of iron or steel, or it may be composed of alternate sheets of iron and steel rolled together in the manner familiar to the manufacturers of safes. The exterior of this plate is countersunk at D, which countersink is of such diameter, depth, and flare as to receive snugly the conical rivet-head B, as seen in Fig. 3. The inner side of plate C is countersunk at E until it joins the outer bore, D, and thereby produces a reversely-flaring or hour-glass-shaped opening completely through said plate, the contracted portion or waist of this opening being about equal in diameter to that of the rivet-shank A. Furthermore, the inner plate, F, is pierced with two precisely-similar countersinks, G and H, that communicate with each other in the manner shown in Fig. 2, the waist of this reversely-flaring opening G H being of the same diameter as the waist of the opening D E of the outer plate, C.

All of the outer and inner plates having thus been drilled with their full complement of double-countersunk holes, and the plates being properly disposed with reference to each other so as to form a safe of the desired size, a heated rivet is then inserted in one of said holes, as seen in Fig. 3. Immediately after insertion the rivet is swaged or headed up with a hammer or hydraulic press or other appliance, and is caused to expand laterally and completely fill the two cavities D E and G H of the respective plates C and F, as represented in Fig. 4. The instant this act is accomplished, and before the rivet has had time to lose any appreciable degree of its heat, a stream of cold water or other suitable fluid is projected against the exposed end of head B, and said rivet is at once rendered so hard as to be practically drill-proof. The rear or stub end of the rivet is now reduced to a level with plate F by grinding or otherwise.

After the outer and inner plates have been united in this manner, any additional plates may be screwed to the one F, so as to afford the desired thickness of safe-walls, and, if preferred, sufficient space may be allowed between these extra plates to receive a fire-proof filling.

The preferred form of rivet employed is represented in Figs. 5 and 6, a reference to which illustrations will show that the shank A is split at $a$ to receive a tapering plug, I, of steel or other hard metal, which plug forms the head of the rivet after being securely welded or forged to the same. (See Fig. 6.)

I have described the apertures D E and G H as being approximately the shape of an hour-glass, but do not propose to limit the invention to this special form, as it is evident the same results may be effected by any kind of opening that will cause the rivets to be anchored or embedded in the plates in such a manner as to prevent said rivets being either pulled out or driven in.

The right is reserved of applying the principles of my invention to the construction of bridges and all other structures composed of metallic plates or bars, or both, united by rivets or bolts or similar retaining devices.

Finally, the within-described method of tempering bolts and rivets may be employed with great advantage in the construction of prisons, &c., in which case the cell-bars can be united with rivets hardened at their outer and inner ends as soon as they are swaged or headed up.

I am aware it is not new to compose a lattice-work of a series of punched plates placed side by side, so that the smaller diameter of the hole of one plate will coincide or be in line with the smaller diameter of the hole of the adjacent plate, as such a riveted structure is seen in Letters Patent No 221,447, granted November 11, 1879, to J. B. Cornell; but I know of no instance where each individual plate of a metallic structure has been provided with holes of a reversely-flaring or hour-glass shape, whereby the rivet is so anchored in each plate as to effectually prevent it being either driven in or pulled out, and therefore my claim to this part of my invention is limited to the aforesaid special shape of rivet-hole in each plate, and is not designed to cover the arrangement seen in the patent just referred to.

I claim as my invention—

1. The within-described process of constructing safes or vaults or other structures composed of a series of metallic plates or bars, which process consists in inserting in the proper holes the rivets while the latter are hot, then upsetting or heading them, and instantly hardening or tempering said rivets or bolts at the same heat, substantially as herein described.

2. The within-described process of constructing safes or vaults or other structures composed of a series of metallic plates or bars, which process consists in inserting in the reversely-flaring holes of each individual plate the bolts or rivets while the latter are hot, then upsetting or heading them and causing them to expand laterally and fill said holes, said rivets being finally tempered or hardened at the same heat, substantially as herein described.

In testimony of which invention I hereunto set my hand.

ALOIS J. KLEIN.

Witnesses:
JAMES H. LAYMAN,
WM. J. T. WILSON.